United States Patent
Wei

(10) Patent No.: US 12,466,954 B2
(45) Date of Patent: Nov. 11, 2025

(54) PREPARATION METHOD FOR AIR-PERMEABLE AND ANTIBACTERIAL SILICONE RUBBER MATERIAL AND APPLICATION THEREOF IN HOME TEXTILES

(71) Applicant: Dongguan Jinlv New Materials Co., Ltd., Dongguan (CN)

(72) Inventor: Haidong Wei, Dongguan (CN)

(73) Assignee: Dongguan Jinlv New Materials Co., Ltd., Dongguan (CN)

(*) Notice: Subject to any disclaimer, the term of this patent is extended or adjusted under 35 U.S.C. 154(b) by 98 days.

(21) Appl. No.: 18/644,775

(22) Filed: Apr. 24, 2024

(65) Prior Publication Data
US 2025/0059371 A1 Feb. 20, 2025

(30) Foreign Application Priority Data
Aug. 16, 2023 (CN) .......................... 202311032799.8

(51) Int. Cl.
| | |
|---|---|
| *C08L 83/10* | (2006.01) |
| *A01N 55/00* | (2006.01) |
| *B29C 43/00* | (2006.01) |
| *B29B 7/00* | (2006.01) |
| *B29B 7/10* | (2006.01) |

(Continued)

(52) U.S. Cl.
CPC .............. *C08L 83/10* (2013.01); *A01N 55/00* (2013.01); *B29C 43/003* (2013.01); *B29B 7/005* (2013.01); *B29B 7/10* (2013.01); *B29B 13/06* (2013.01); *B29K 2075/00* (2013.01); *B29K 2083/00* (2013.01); *B29K 2105/0005* (2013.01); *B29K 2105/0014* (2013.01); *B29K 2105/0088* (2013.01); *B29K 2105/24* (2013.01);

(Continued)

(58) Field of Classification Search
CPC ................................................... B29C 43/003
See application file for complete search history.

(56) References Cited

U.S. PATENT DOCUMENTS

| | | | |
|---|---|---|---|
| 5,641,442 A * | 6/1997 | Shih ...................... | B01D 71/24 521/919 |
| 7,169,884 B2 | 1/2007 | Yeung | |

(Continued)

FOREIGN PATENT DOCUMENTS

WO  WO-2012014762 A1 * 2/2012 ............. A01N 33/12

*Primary Examiner* — Atul P. Khare

(57) ABSTRACT

The present disclosure relates to the technical field of silicone rubbers, and discloses a preparation method for an air-permeable and antibacterial silicone rubber material and an application thereof in home textiles. Activated silicone rubber and double quaternary ammonium salt-type benzoic acid are subjected to an esterification reaction under the catalysis of p-toluenesulfonic acid to obtain double quaternary ammonium salt-grafted silicone rubber. The double quaternary ammonium salt-grafted silicone rubber is blended with silicone rubber and then applied to home textiles, wherein the quaternary ammonium salt component can destroy cellular enzymes in bacteria and has an antibacterial effect, and the silicon-oxygen-silicon in the silicone rubber not only has excellent air permeability, but also has excellent mechanical properties. Finally, the home textile material with excellent antibacterial properties, air permeability and mechanical properties is obtained.

9 Claims, 1 Drawing Sheet

(51) Int. Cl.
 B29B 13/06    (2006.01)
 B29K 75/00    (2006.01)
 B29K 83/00    (2006.01)
 B29K 105/00   (2006.01)
 B29K 105/24   (2006.01)

(52) U.S. Cl.
 CPC .................. B29K 2995/0065 (2013.01);
       B29K 2995/007 (2013.01); B29K 2995/0077
                                         (2013.01)

(56) References Cited

U.S. PATENT DOCUMENTS

| | | |
|---|---|---|
| 7,776,935 B2 | 8/2010 | Hirayama et al. |
| 8,293,834 B2 | 10/2012 | Meyer |
| 2016/0017195 A1 | 1/2016 | Pichl et al. |

\* cited by examiner

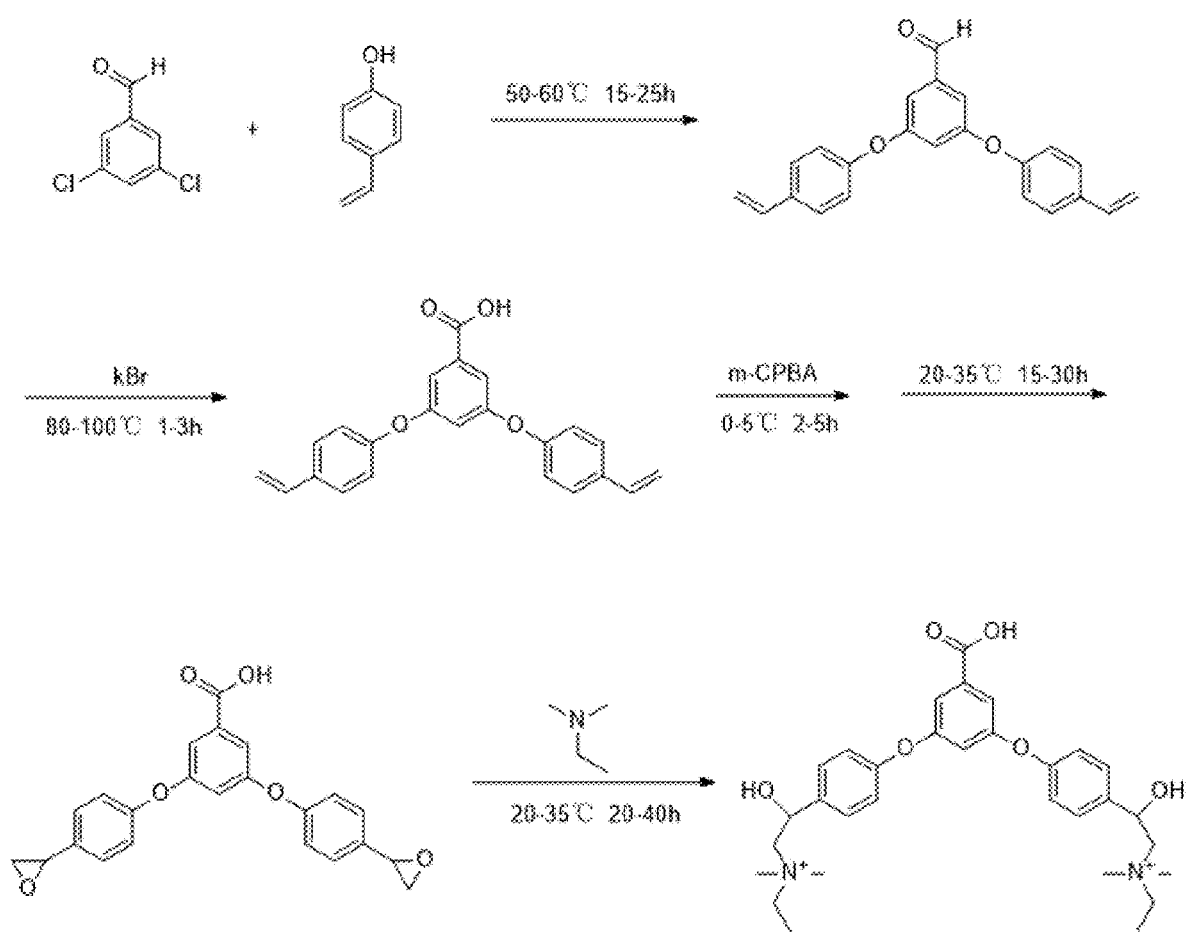

PREPARATION METHOD FOR AIR-PERMEABLE AND ANTIBACTERIAL SILICONE RUBBER MATERIAL AND APPLICATION THEREOF IN HOME TEXTILES

CROSS-REFERENCE TO RELATED APPLICATION

The present application claims priority to Chinese Patent Application No. 202311032799.8, filed on Aug. 16, 2023, the entire contents of which are incorporated herein by reference.

TECHNICAL FIELD

The present disclosure relates to the technical field of silicone rubbers, and in particular, to a preparation method for an air-permeable and antibacterial silicone rubber material and an application thereof in home textiles.

BACKGROUND

The silicone rubber is a synthetic resin material with excellent properties such as chemical stability, flexibility and elasticity, and is widely used in the fields such as a transportation, a home furnishing, a medicine and chemicals. In the field of home textiles, the silicone rubber is a commonly used material. During use, the sweat discharged from a human body will enter the silicone rubber material, resulting in more bacteria in the home textile material containing a silicone rubber core and further causing mold and odor. After long-term use, the silicone rubber material is also prone to aging and has poor mechanical properties. Therefore, how to improve the antibacterial properties, an air permeability, and mechanical properties of the home textile material containing the silicone rubber core, and thereby improve the comfort and durability of the home textile material, has become a current research hotspot.

The silicone rubber is a polymer compound formed by alternating silicon and oxygen atoms. It has excellent properties such as an aging resistance, a high temperature resistance, an elasticity and an air permeability, and thus is widely applied to the fields such as medical treatments, automobiles, electronics, transportation and home textiles. For example, Patent Application No. CN112143231A discloses a silicone rubber/silicone rubber thermoplastic vulcanizate and a preparation method therefor. The silicone rubber/silicone rubber thermoplastic vulcanizate prepared by this disclosure has excellent mechanical properties but poor antibacterial properties. An quaternary ammonium salt is a compound formed by substituting all hydrogens in ammonium ions with hydrocarbon groups, and is widely applied to the fields such as bactericides, flocculants and thickeners. For example, Patent Application No. CN109021199A discloses a preparation method for a water-based silicone rubber leather finishing agent containing a quaternary ammonium salt bactericidal group, and the quaternary ammonium salt/silicone rubber water-based finishing material prepared by this disclosure has excellent bactericidal properties but poor mechanical properties.

SUMMARY OF INVENTION

Technical Problems to be Resolved

Aiming at the defects in the prior art, the present disclosure provides a preparation method for an air-permeable and antibacterial silicone rubber material and an application thereof in home textiles. The prepared double quaternary ammonium salt-type benzoic acid is grafted into the silicone rubber and applied to the silicone rubber material. The prepared silicone rubber material has excellent antibacterial properties, an excellent air permeability and excellent mechanical properties.

(II) Technical Solutions

A preparation method for an air-permeable and antibacterial silicone rubber material consisting of the following components in parts by weight:
  50-70 parts by weight of a double quaternary ammonium salt-grafted silicone rubber, 30-50 parts by weight of a polyurethane elastomer, 1-2 parts by weight of a compatilizer, and 0.5-1 parts by weight of a vulcanizing agent;
  the air-permeable and antibacterial silicone rubber material is prepared by the following steps:
  placing an activated silicone rubber, a double quaternary ammonium salt-type benzoic acid and a p-toluenesulfonic acid catalyst in a reaction kettle filled with a toluene solvent, reacting at 70-90° C. for 5-10 h, washing with deionized water after the reaction is completed, and drying to obtain the double quaternary ammonium salt-grafted silicone rubber; and
  at 180-200° C., placing the double quaternary ammonium salt-grafted silicone rubber, the polyurethane elastomer, the compatilizer and the vulcanizing agent in a torque rheometer with a rotating speed of 50-80 r/min, blending for 10-20 min, cooling to the room temperature after the blending is completed, and performing compression molding in a flat vulcanizing machine with a pressure of 10-12 MPa to obtain the air-permeable and antibacterial silicone rubber material.

Preferably, a ratio of the activated silicone rubber in parts by weight to the double quaternary ammonium salt-type benzoic acid in parts by weight to the p-toluenesulfonic acid catalyst in parts by weight in the step (1) is 100:400-500:10-30.

Preferably, the vulcanization in the step (2) is as follows: a primary vulcanization is performed at 170-190° C. for 5-15 min, and a secondary vulcanization is performed in an oven at 200-220° C. for 4-8 h.

Preferably, the double quaternary ammonium salt-type benzoic acid in the step (1) is prepared by the following steps:
  (3) dissolving 3,5-dichlorobenzaldehyde in a reaction kettle filled with an acetone solvent, stirring for dissolving, adding a solution of 4-vinylphenol in acetone into the reaction kettle at 50-60° C., stirring uniformly, refluxing for reaction for 15-25 h, after the reaction is completed, filtrating in vacuum, washing with deionized water and acetone in sequence, and drying to obtain a distyryl benzaldehyde intermediate;
  (4) placing the distyryl benzaldehyde intermediate into a reaction kettle filled with an acetic acid solvent, stirring for dissolving, adding a potassium bromide oxidant into the reaction kettle at 80-100° C., stirring for reaction for 1-3 h, cooling to the room temperature after the reaction is completed, filtrating in vacuum, washing with deionized water, recrystallizing with ethanol, and drying to obtain a distyryl benzoic acid intermediate;
  (5) dissolving the distyryl benzoic acid intermediate in a reaction kettle filled with a dichloromethane solvent, adding m-chloroperoxybenzoic acid into the reaction kettle at 0-5° C., stirring and mixing for 2-5 h, heating to the room temperature, reacting for 15-30 h, after the reaction is completed, washing with a saturated sodium bicarbonate solution and a saturated saline solution in sequence, and drying to obtain a diphenyl epoxy benzoic acid intermediate; and (6) dissolving the diphenyl epoxy benzoic acid intermediate in a reaction kettle filled with an absolute ethanol solvent, adding N,N-dimethylethylamine into the reaction kettle, stirring for reaction for 20-40 h, distilling under a reduced pressure, washing with acetone, and drying to obtain the double quaternary ammonium salt-type benzoic acid.

Preferably, a molar ratio of 3,5-dichlorobenzaldehyde to 4-vinylphenol in the step (3) is 1:2-2.5.

Preferably, a molar ratio of the distyryl benzaldehyde intermediate to the potassium bromide in the step (4) is 1:0.3-0.5.

Preferably, a molar ratio of the distyryl benzoic acid intermediate to m-chloroperoxybenzoic acid in the step (5) is 1:2-4.

Preferably, a molar ratio of the diphenyl epoxy benzoic acid intermediate to N,N-dimethylethylamine in the step (6) is 1:2-2.5.

Preferably, the prepared air-permeable and antibacterial silicone rubber material is placed in a cover body of a home textile material to obtain a home textile material containing a silicone rubber core.

(III) Beneficial Technical Effects 3,5-dichlorobenzaldehyde and 4-vinylphenol are subjected to a substitution reaction to obtain a distyryl benzaldehyde intermediate, the distyryl benzaldehyde intermediate is oxidized by potassium bromide to obtain a distyryl benzoic acid intermediate, the distyryl benzoic acid intermediate is subjected to alkenyl epoxidation to obtain a diphenyl epoxy benzoic acid intermediate, the nitrogen atom in N,N-dimethylethylamine attack the epoxy group in the diphenyl epoxy benzoic acid intermediate for ring-opening reaction, thereby obtaining the double quaternary ammonium salt-type benzoic acid through quaternization. The activated silicone rubber and the double quaternary ammonium salt-type benzoic acid are subjected to an esterification reaction under the catalysis of p-toluenesulfonic acid to obtain the double quaternary ammonium salt-grafted silicone rubber. The double quaternary ammonium salt-grafted silicone rubber, the polyurethane elastomer, the compatilizer and the vulcanizing agent are uniformly mixed and vulcanized in a flat vulcanizing machine, and finally the air-permeable and antibacterial silicone rubber material is obtained.

According to the silicone rubber material prepared by the present disclosure, the contained double quaternary ammonium salt is an antibacterial group and has an excellent bactericidal effect compared with a single quaternary ammonium salt, the surface of the quaternary ammonium salt has positive charges that can be adsorbed onto the surface of a bacterial cell with negative charges through electrostatic action and enters the interior of a cell membrane, and the cellular enzyme in bacteria is passivated and cannot generate protease, so that bacteria are inactivated, and the antibacterial effect is achieved. The silicon-oxygen-silicon bonds on the main chain of the silicone rubber are prone to rotate, molecular chains are flexible, and cohesive energy density is low, such that amorphous aggregation state has a large free volume; therefore the silicone rubber has a greater air permeability. In addition, due to the large bond energy, the silicone rubber can absorb high impact energy when being impacted. In addition, the double quaternary ammonium salt-type benzoic acid prepared by the present disclosure has more benzene ring rigid structures and oxygen elements, the benzene ring structures have higher modulus, a stable cross-linked network structure can be formed by cross-linking and stacking the benzene ring structures, the oxygen elements have a higher polarity and can form hydrogen bonds, and the double quaternary ammonium salt-type benzoic acid can absorb more impact energy when being impacted with the assistance of these three, so that the mechanical property of the silicone rubber material is jointly improved.

A novel double quaternary ammonium salt-grafted silicone rubber is prepared by the present disclosure and blended with a silicone rubber material, and the obtained silicone rubber material is applied to home textiles, so that the prepared home textiles have excellent antibacterial properties, an excellent air permeability and excellent mechanical properties.

BRIEF DESCRIPTION OF DRAWINGS

FIGURE shows a preparation route of double quaternary ammonium salt-type benzoic acid.

DETAILED DESCRIPTION OF EMBODIMENTS

To make the objectives, embodiments and advantages of the present application clearer, the following clearly and completely describes exemplary embodiments of the present application with reference to the accompanying drawings in the exemplary embodiments of the present application. It is clear that the described exemplary embodiments are merely some rather than all of embodiments of the present application.

It should be noted that the brief descriptions of the terms in the present application are only for the convenience of understanding the embodiments described below, and are not intended to limit the embodiments of the present application. These terms should be understood according to ordinary and common meaning unless otherwise specified.

The preparation method for the activated silicone rubber comprises: cutting up silicone rubber, placing in absolute alcohol for cleaning, after drying, placing the silicone rubber in a methanol solution of potassium hydroxide with a mass fraction of 1%, stirring and soaking at 50° C. for 40-80 min, and washing with methanol to obtain the activated silicone rubber.

The compatilizer is KH550, and the vulcanizing agent is a bis-2,5 vulcanizing agent.

The silicone rubber material of the present disclosure is prepared by the following preparation steps of examples and comparative examples.

Example 1

S1: 0.2 mol of 3,5-dichlorobenzaldehyde was dissolved in a reaction kettle filled with an acetone solvent, stirred for dissolving. An acetone solution containing 0.4 mol of 4-vinylphenol was added into the reaction kettle at 55° C., stirred uniformly, refluxed for reaction for 25 h, after the reaction was completed, filtrated in vacuum, washed with deionized water and acetone in sequence, and dried to obtain a distyryl benzaldehyde intermediate.

S2: 0.03 mol of the distyryl benzaldehyde intermediate was placed into a reaction kettle filled with an acetic acid solvent, stirred for dissolving. 0.015 mol of potassium bromide oxidant was added into the reaction kettle at 90° C., stirred for reaction for 3 h, cooled to the room temperature after the reaction was completed, filtrated in vacuum, washed with deionized water, recrystallized with ethanol, and dried to obtain a distyrylbenzoic acid intermediate.

S3: 0.06 mol of the distyrylbenzoic acid intermediate was dissolved in a reaction kettle filled with a dichloromethane solvent. 0.2 mol of m-chloroperoxybenzoic acid was added into the reaction kettle at 5° C., stirred and mixed for 3 h, heated to the room temperature, reacted for 20 h, after the reaction was completed, washed with a saturated sodium bicarbonate solution and a saturated saline solution in sequence, and dried to obtain a diphenyl epoxy benzoic acid intermediate.

S4: 0.08 mol of the diphenyl epoxy benzoic acid intermediate was dissolved in a reaction kettle filled with an absolute ethanol solvent, 0.2 mol of N,N-dimethylethylamine was added into the reaction kettle, stirred for reaction for 30 h, distilled under a reduced pressure, washed with acetone, and dried to obtain the double quaternary ammonium salt-type benzoic acid.

S5: 100 parts by weight of the activated silicone rubber, 400 parts by weight of the double quaternary ammonium salt-type benzoic acid and 20 parts by weight of p-toluenesulfonic acid catalyst were placed in a reaction kettle filled with a toluene solvent, reacted at 80° C. for 8 h, washed with deionized water after the reaction was completed, and dried to obtain double quaternary ammonium salt-grafted silicone rubber.

S6: at 200° C., 30 parts by weight of the double quaternary ammonium salt-grafted silicone rubber, 70 parts by weight of the polyurethane elastomer, 2 parts by weight of the compatilizer and 0.5 parts by weight of the vulcanizing agent were placed in a torque rheometer with a rotating speed of 60 r/min, blended for 15 min, cooled to the room temperature after the blending was completed, and compression molding was performed in a flat vulcanizing machine with a pressure of 12 MPa, wherein the vulcanization was as follows: a primary vulcanization was performed at 180° C. for 10 min, and a secondary vulcanization was performed in an oven at 220° C. for 6 h, and finally the air-permeable and antibacterial silicone rubber material was obtained.

Example 2

S1: 0.2 mol of 3,5-dichlorobenzaldehyde was dissolved in a reaction kettle filled with an acetone solvent, stirred for dissolving, an acetone solution containing 0.5 mol of 4-vinylphenol was added into the reaction kettle at 50° C., stirred uniformly, refluxed for reaction for 20 h, after the reaction was completed, filtrated in vacuum, washed with deionized water and acetone in sequence, and dried to obtain a distyryl benzaldehyde intermediate.

S2: 0.03 mol of the distyryl benzaldehyde intermediate was placed into a reaction kettle filled with an acetic acid solvent, stirred for dissolving, 0.015 mol of potassium bromide oxidant was added into the reaction kettle at 90° C., stirred for reaction for 3 h, cooled to the room temperature after the reaction was completed, filtrated in vacuum, washed with deionized water, recrystallized with ethanol, and dried to obtain a distyryl benzoic acid intermediate.

S3: 0.06 mol of the distyryl benzoic acid intermediate was dissolved in a reaction kettle filled with a dichloromethane solvent, 0.15 mol of m-chloroperoxybenzoic acid was added into the reaction kettle at 0° C., stirred and mixed for 4 h, heated to the room temperature, reacted for 20 h, after the reaction was completed, washed with a saturated sodium bicarbonate solution and a saturated saline solution in sequence, and dried to obtain a diphenyl epoxy benzoic acid intermediate.

S4: 0.08 mol of the diphenyl epoxy benzoic acid intermediate was dissolved in a reaction kettle filled with an absolute ethanol solvent, 0.2 mol of N,N-dimethylethylamine was added into the reaction kettle, stirred for reaction for 30 h, distilled under a reduced pressure, washed with acetone, and dried to obtain the double quaternary ammonium salt-type benzoic acid.

S5: 100 parts by weight of the activated silicone rubber, 450 parts by weight of the double quaternary ammonium salt-type benzoic acid and 25 parts by weight of p-toluenesulfonic acid catalyst were placed in a reaction kettle filled with a toluene solvent, reacted at 80° C. for 6 h, washed with deionized water after the reaction was completed, and dried to obtain double quaternary ammonium salt-grafted silicone rubber.

S6: at 190° C., 35 parts by weight of the double quaternary ammonium salt-grafted silicone rubber, 65 parts by weight of the polyurethane elastomer, 2 parts by weight of the compatilizer and 0.5 parts by weight of the vulcanizing agent were placed in a torque rheometer with a rotating speed of 70 r/min, blended for 10 min, cooled to the room temperature after the blending was completed, and compression molding was performed in a flat vulcanizing machine with a pressure of 11 MPa, wherein the vulcanization was as follows: a primary vulcanization was performed at 180° C. for 10 min, and a secondary vulcanization was performed in an oven at 210° C. for 6 h, and finally the air-permeable and antibacterial silicone rubber material was obtained.

Example 3

S1: 0.2 mol of 3,5-dichlorobenzaldehyde was dissolved in a reaction kettle filled with an acetone solvent, stirred for dissolving, an acetone solution containing 0.45 mol of 4-vinylphenol was added into the reaction kettle at 55° C., stirred uniformly, refluxed for reaction for 20 h, after the reaction was completed, filtrated in vacuum, washed with deionized water and acetone in sequence, and dried to obtain a distyryl benzaldehyde intermediate.

S2: 0.03 mol of the distyryl benzaldehyde intermediate was placed into a reaction kettle filled with an acetic acid solvent, stirred for dissolving, 0.025 mol of potassium bromide oxidant was added into the reaction kettle at 80° C., stirred for reaction for 2 h, cooled to the room temperature after the reaction was completed, filtrated in vacuum, washed with deionized water, recrystallized with ethanol, and dried to obtain a distyryl benzoic acid intermediate.

S3: 0.06 mol of the distyryl benzoic acid intermediate was dissolved in a reaction kettle filled with a dichloromethane solvent, 0.24 mol of m-chloroperoxybenzoic acid was added into the reaction kettle at 3° C., stirred and mixed for 2 h, heated to the room temperature, reacted for 20 h, after the reaction was completed, washed with a saturated sodium bicarbonate solution and a saturated saline solution in sequence, and dried to obtain a diphenyl epoxy benzoic acid intermediate.

S4: 0.08 mol of the diphenyl epoxy benzoic acid intermediate was dissolved in a reaction kettle filled with an absolute ethanol solvent, 0.2 mol of N,N-dimethylethylamine was added into the reaction kettle, stirred for reaction for 30 h, distilled under a reduced pressure, washed with acetone, and dried to obtain the double quaternary ammonium salt-type benzoic acid.

S5: 100 parts by weight of the activated silicone rubber, 480 parts by weight of the double quaternary ammonium salt-type benzoic acid and 20 parts by weight of p-toluenesulfonic acid catalyst were placed in a reaction kettle filled with a toluene solvent, reacted at 80° C. for 8 h, washed with deionized water after the reaction was completed, and dried to obtain double quaternary ammonium salt-grafted silicone rubber.

S6: at 190° C., 40 parts by weight of the double quaternary ammonium salt-grafted silicone rubber, 60 parts by weight of the polyurethane elastomer, 2 parts by weight of the compatilizer and 0.5 parts by weight of the vulcanizing agent were placed in a torque rheometer with a rotating speed of 70 r/min, blended for 10 min, cooled to the room temperature after the blending was completed, and compression molding was performed in a flat vulcanizing machine with a pressure of 12 MPa, wherein the vulcanization was as follows: a primary vulcanization was performed at 180° C. for 15 min, and a secondary vulcanization was performed in an oven at 200° C. for 6 h, and finally the air-permeable and antibacterial silicone rubber material was obtained.

Example 4

S1: 0.2 mol of 3,5-dichlorobenzaldehyde was dissolved in a reaction kettle filled with an acetone solvent, stirred for dissolving, an acetone solution containing 0.5 mol of 4-vinylphenol was added into the reaction kettle at 60° C., stirred uniformly, refluxed for reaction for 15 h, after the reaction was completed, filtrated in vacuum, washed with deionized water and acetone in sequence, and dried to obtain a distyryl benzaldehyde intermediate.

S2: 0.03 mol of the distyryl benzaldehyde intermediate was placed into a reaction kettle filled with an acetic acid solvent, stirred for dissolving, 0.015 mol of potassium bromide oxidant was added into the reaction kettle at 90° C., stirred for reaction for 3 h, cooled to the room temperature after the reaction was completed, filtrated in vacuum, washed with deionized water, recrystallized with ethanol, and dried to obtain a distyryl benzoic acid intermediate.

S3: 0.06 mol of the distyryl benzoic acid intermediate was dissolved in a reaction kettle filled with a dichloromethane solvent, 0.2 mol of m-chloroperoxybenzoic acid was added into the reaction kettle at 0° C., stirred and mixed for 5 h, heated to the room temperature, reacted for 15 h, after the reaction was completed, washed with a saturated sodium bicarbonate solution and a saturated saline solution in sequence, and dried to obtain a diphenyl epoxy benzoic acid intermediate.

S4: 0.08 mol of the diphenyl epoxy benzoic acid intermediate was dissolved in a reaction kettle filled with an absolute ethanol solvent, 0.2 mol of N,N-dimethylethylamine was added into the reaction kettle, stirred for reaction for 30 h, distilled under a reduced pressure, washed with acetone, and dried to obtain the double quaternary ammonium salt-type benzoic acid.

S5: 100 parts by weight of the activated silicone rubber, 500 parts by weight of the double quaternary ammonium salt-type benzoic acid and 10 parts by weight of p-toluenesulfonic acid catalyst were placed in a reaction kettle filled with a toluene solvent, reacted at 80° C. for 8 h, washed with deionized water after the reaction was completed, and dried to obtain double quaternary ammonium salt-grafted silicone rubber.

S6: at 190° C., 45 parts by weight of the double quaternary ammonium salt-grafted silicone rubber, 55 parts by weight of the polyurethane elastomer, 1 part by weight of the compatilizer and 1 part by weight of the vulcanizing agent were placed in a torque rheometer with a rotating speed of 80 r/min, blended for 15 min, cooled to the room temperature after the blending was completed, and compression molding was performed in a flat vulcanizing machine with a pressure of 12 MPa, wherein the vulcanization was as follows: a primary vulcanization was performed at 170° C. for 10 min, and a secondary vulcanization was performed in an oven at 210° C. for 7 h, and finally the air-permeable and antibacterial silicone rubber material was obtained.

Example 5

S1: 0.2 mol of 3,5-dichlorobenzaldehyde was dissolved in a reaction kettle filled with an acetone solvent, stirred for dissolving, an acetone solution containing 0.45 mol of 4-vinylphenol was added into the reaction kettle at 55° C., stirred uniformly, refluxed for reaction for 15 h, after the reaction was completed, filtrated in vacuum, washed with deionized water and acetone in sequence, and dried to obtain a distyryl benzaldehyde intermediate.

S2: 0.03 mol of the distyryl benzaldehyde intermediate was placed into a reaction kettle filled with an acetic acid solvent, stirred for dissolving, 0.015 mol of potassium bromide oxidant was added into the reaction kettle at 100° C., stirred for reaction for 3 h, cooled to the room temperature after the reaction was completed, filtrated in vacuum, washed with deionized water, recrystallized with ethanol, and dried to obtain a distyryl benzoic acid intermediate.

S3: 0.06 mol of the distyryl benzoic acid intermediate was dissolved in a reaction kettle filled with a dichloromethane solvent, 0.24 mol of m-chloroperoxybenzoic acid was added into the reaction kettle at 0° C., stirred and mixed for 4 h, heated to the room temperature, reacted for 20 h, after the reaction was completed, washed with a saturated sodium bicarbonate solution and a saturated saline solution in sequence, and dried to obtain a diphenyl epoxy benzoic acid intermediate.

S4: 0.08 mol of the diphenyl epoxy benzoic acid intermediate was dissolved in a reaction kettle filled with an absolute ethanol solvent, 0.16 mol of N,N-dimethylethylamine was added into the reaction kettle, stirred for reaction for 30 h, distilled under a reduced pressure, washed with acetone, and dried to obtain the double quaternary ammonium salt-type benzoic acid.

S5: 100 parts by weight of the activated silicone rubber, 500 parts by weight of the double quaternary ammonium salt-type benzoic acid and 30 parts by weight of p-toluenesulfonic acid catalyst were placed in a reaction kettle filled with a toluene solvent, reacted at 80° C. for 8 h, washed with deionized water after the reaction was completed, and dried to obtain double quaternary ammonium salt-grafted silicone rubber.

S6: at 190° C., 50 parts by weight of the double quaternary ammonium salt-grafted silicone rubber, 50 parts by weight of the polyurethane elastomer, 1 part by weight of the compatilizer and 1 part by weight of the vulcanizing agent were placed in a torque rheometer with a rotating speed of 80 r/min, blended for 15 min, cooled to the room temperature after the blending was completed, and compression molding was performed in a flat vulcanizing machine with a pressure of 11 MPa, wherein the vulcanization was as follows: a primary vulcanization was performed at 190° C. for 5 min, and a secondary vulcanization was performed in an oven at 210° C. for 5 h, and finally the air-permeable and antibacterial silicone rubber material was obtained.

Comparative Example 1

S1: at 200° C., 30 parts by weight of the activated silicone rubber, 70 parts by weight of the polyurethane elastomer, 2 parts by weight of the compatilizer and 0.5 parts by weight of the vulcanizing agent were placed in a torque rheometer with a rotating speed of 60 r/min, blended for 15 min, cooled to the room temperature after the blending was completed, and compression molding was performed in a flat vulcanizing machine with a pressure of 12 MPa, wherein the vulcanization was as follows: a primary vulcanization was performed at 180° C. for 10 min, and a secondary vulcanization was performed in an oven at 220° C. for 6 h, and finally the silicone rubber material was obtained.

Comparative Example 2

S1: 0.2 mol of 3,5-dichlorobenzaldehyde was dissolved in a reaction kettle filled with an acetone solvent, stirred for dissolving, an acetone solution containing 0.4 mol of 4-vinylphenol was added into the reaction kettle at 55° C., stirred uniformly, refluxed for reaction for 25 h, after the reaction was completed, filtrated in vacuum, washed with deionized water and acetone in sequence, and dried to obtain a distyryl benzaldehyde intermediate.

S2: 0.03 mol of the distyryl benzaldehyde intermediate was placed into a reaction kettle filled with an acetic acid solvent, stirred for dissolving, 0.015 mol of potassium bromide oxidant was added into the reaction kettle at 90° C., stirred for reaction for 3 h, cooled to the room temperature after the reaction was completed, filtrated in vacuum, washed with deionized water, recrystallized with ethanol, and dried to obtain a distyryl benzoic acid intermediate.

S3: 0.06 mol of the distyryl benzoic acid intermediate was dissolved in a reaction kettle filled with a dichloromethane solvent, 0.2 mol of m-chloroperoxybenzoic acid was added into the reaction kettle at 5° C., stirred and mixed for 3 h, heated to the room temperature, reacted for 20 h, after the reaction was completed, washed with a saturated sodium bicarbonate solution and a saturated saline solution in sequence, and dried to obtain a diphenyl epoxy benzoic acid intermediate.

S4: 0.08 mol of the diphenyl epoxy benzoic acid intermediate was dissolved in a reaction kettle filled with an absolute ethanol solvent, 0.2 mol of N,N-dimethylethylamine was added into the reaction kettle, stirred for reaction for 30 h, distilled under a reduced pressure, washed with acetone, and dried to obtain the double quaternary ammonium salt-type benzoic acid.

S5: at 200° C., 30 parts by weight of the double quaternary ammonium salt-type benzoic acid, 70 parts by weight of the polyurethane elastomer, 2 parts by weight of the compatilizer and 0.5 parts by weight of the vulcanizing agent were placed in a torque rheometer with a rotating speed of 60 r/min, blended for 15 min, cooled to the room temperature after the blending was completed, and compression molding was performed in a flat vulcanizing machine with a pressure of 12 MPa, wherein the vulcanization was as follows: a primary vulcanization was performed at 180° C. for 10 min, and a secondary vulcanization was performed in an oven at 220° C. for 6 h, and finally the silicone rubber material was obtained.

The silicone rubber materials obtained from Examples and Comparative Examples were subjected to the following tests.

Antibacterial performance test: the dried and sterilized silicone rubber material was placed into a phosphoric acid buffer solution, the phosphoric acid buffer solution without the silicone rubber material was taken as a blank control sample, inoculated with *Escherichia coli*, shaked and contacted for 12 h. 1 mL of the shaked bacterial liquid was added into a culture dish, cultured for 36 h at 37° C., the number of bacteria was determined, and the bacteriostatic rate was calculated, wherein $Y=(A-B)/A\times 100\%$.

The test results are shown in the table below:

|  | A (CFU/mL) | B (CFU/mL) | Y (%) |
| --- | --- | --- | --- |
| Example 1 | $3.85 \times 10^7$ | $3.71 \times 10^7$ | 96.4 |
| Example 2 | $3.85 \times 10^7$ | $3.78 \times 10^7$ | 98.2 |
| Example 3 | $3.85 \times 10^7$ | $3.81 \times 10^7$ | 90.0 |
| Example 4 | $3.85 \times 10^7$ | $3.82 \times 10^7$ | 99.2 |
| Example 5 | $3.85 \times 10^7$ | $3.84 \times 10^7$ | 99.7 |
| Comparative Example 1 | $3.85 \times 10^7$ | $0.96 \times 10^7$ | 24.9 |
| Comparative Example 2 | $3.85 \times 10^7$ | $3.72 \times 10^7$ | 96.6 |

A is the number of viable bacteria (CFU/mL) after the blank sample comes into contact with bacteria.

B is the number of viable bacteria (CFU/mL) after the sample comes into contact with bacteria. Y is the bacteriostatic rate.

The antibacterial effects of Examples 1-5 and Comparative Example 2 are better, and the antibacterial effect of Comparative Example 1 is poor. This is because the double quaternary ammonium salt component is contained in Examples 1-5 and Comparative Example 2, and the quaternary ammonium salt has a broad-spectrum sterilization effect and can enter bacterial cells to passivate the cells, so that bacteriostasis and sterilization are achieved. In Comparative Example 1, no quaternary ammonium salt was added, and thus the antibacterial effect was the worst.

The tensile strength of the silicone rubber material was tested using a universal tester. The stretching rate was 500 mm/min.

The Shore A hardness of silicone rubber material was tested using a Shore A hardness tester.

The test results are shown in the table below:

|  | Tensile strength/MPa | Elongation at break (%) | Hardness |
| --- | --- | --- | --- |
| Example 1 | 3.54 | 206 | 60 |
| Example 2 | 3.90 | 258 | 65 |
| Example 3 | 4.36 | 314 | 72 |
| Example 4 | 4.81 | 264 | 68 |
| Example 5 | 4.46 | 213 | 63 |
| Comparative Example 1 | 3.56 | 211 | 59 |
| Comparative Example 2 | 2.67 | 183 | 46 |

The mechanical properties of Examples 1-5 and Comparative Example 1 are better than those of Comparative Example 2. This is because the activated silicone rubber with larger silicon-oxygen bond energy is added in Examples 1-5 and Comparative Example 1, and because the silicon-oxygen-silicon chains are flexible and are cross-linked and wound with each other to form a huge network structure, the energy suffered by the silicone rubber material can be transferred when the silicone rubber material is impacted, so that the mechanical properties of the silicone rubber material are improved. The prepared double quaternary ammonium salt-type benzoic acid that is added in Comparative Example 2 is a small molecular structure, and the accumulated and superposed benzene ring structures and hydrogen bonds of this small molecular structure can also transfer the impact energy suffered by the silicone rubber material; however, the above is inferior to the mechanical properties brought by the silicone rubber, so the mechanical properties of Comparative Example 2 are poor.

The air permeability of the silicone rubber material was tested using an oxygen transmission rate tester.

| | Oxygen transmission rate/cm$^3$ (m$^2$ · d · Pa)$^{-1}$ |
|---|---|
| Example 1 | 369.237 |
| Example 2 | 308.116 |
| Example 3 | 223.889 |
| Example 4 | 158.434 |
| Example 5 | 178.691 |
| Comparative Example 1 | 396.145 |
| Comparative Example 2 | 462.336 |

The oxygen transmission rate of Examples 1-5 and Comparative Example 1 is lower than that of Comparative Example 2, and thus the air permeability of Examples 1-5 and Comparative Example 1 is better than that of Comparative Example 2. This is because the silicone rubber having a silicon-oxygen-silicon chain is added to Examples 1-5 and Comparative Example 1, and the silicon-oxygen-silicon chain is a flexible chain that is easy to rotate and has a low cohesive energy density, and the amorphous aggregate state has a large free volume. Therefore, Examples 1-5 and Comparative Example 1 have a large air permeability, and while Comparative Example 2 has no silicone rubber added thereto and thus has a poor air permeability.

In conclusion, the air-permeable and antibacterial silicone rubber material prepared in the solutions of the present disclosure has both better antibacterial performance and a better air permeability.

The above embodiments are provided only for illustrating the present disclosure and not for limiting the present disclosure. Those skilled in the art can make various changes and modifications without departing from the spirit and scope of the present disclosure, therefore all equivalent technical solutions should also fall into the scope of the present disclosure, and should be defined by the claims.

The invention claimed is:

1. A preparation method for an air-permeable and antibacterial silicone rubber material, wherein the silicone rubber material consists of the following components in parts by weight:
    50-70 parts by weight of a double quaternary ammonium salt-grafted silicone rubber, 30-50 parts by weight of a polyurethane elastomer, 1-2 parts by weight of a compatibilizer, and 0.5-1 parts by weight of a vulcanizing agent; and
    wherein the air-permeable and antibacterial silicone rubber material is prepared by the following steps:
    (1) placing an activated silicone rubber, a double quaternary ammonium salt-type benzoic acid and a p-toluenesulfonic acid catalyst in a first reaction kettle filled with a toluene solvent, reacting the activated silicone rubber with the double quaternary ammonium salt-type benzoic acid at 70-90° C. for 5-10 h to obtain a first reaction product, washing the first reaction product with deionized water, and drying the first reaction product to obtain the double quaternary ammonium salt-grafted silicone rubber; and
    (2) at 180-200° C., placing the double quaternary ammonium salt-grafted silicone rubber, the polyurethane elastomer, the compatibilizer and the vulcanizing agent in a torque rheometer with a rotating speed of 50-80 r/min to form a mixture, blending the mixture for 10-20 min, cooling the blended mixture to room temperature, and performing vulcanization and compression molding on the cooled mixture in a flat vulcanizing machine with a pressure of 10-12 MPa to obtain the air-permeable and antibacterial silicone rubber material.

2. The preparation method for an air-permeable and antibacterial silicone rubber material according to claim 1, wherein a ratio of the activated silicone rubber in parts by weight to the double quaternary ammonium salt-type benzoic acid in parts by weight to the p-toluenesulfonic acid catalyst in parts by weight in the step (2) is 100:400-500:10-30.

3. The preparation method for an air-permeable and antibacterial silicone rubber material according to claim 1, wherein the vulcanization in the step (2) is performed as follows: a primary vulcanization is performed at 170-190° C. for 5-15 min, and a secondary vulcanization is performed in an oven at 200-220° C. for 4-8 h.

4. The preparation method for an air-permeable and antibacterial silicone rubber material according to claim 1, wherein a preparation method for the double quaternary ammonium salt-type benzoic acid in the step (1) is as follows:
    (3) stirring and dissolving 3,5-dichlorobenzaldehyde in a second reaction kettle filled with an acetone solvent, adding and uniformly stirring a solution of 4-vinylphenol in acetone into the second reaction kettle at 50-60° C., refluxing to form a second reaction product of the 3,5-dichlorobenzaldehyde with the 4-vinylphenol for 15-25 h, filtrating the second reaction product in vacuum, washing the second reaction product with deionized water and acetone in sequence, and drying the second reaction product to obtain a distyryl benzaldehyde intermediate;
    (4) placing and stirring for dissolving the distyryl benzaldehyde intermediate into a third reaction kettle filled with an acetic acid solvent, adding a potassium bromide oxidant into the third reaction kettle at 80-100° C. and stirring for 1-3 h to form a third reaction product of the distyryl benzaldehyde intermediate with the potassium bromide oxidant, cooling the third reaction product to room temperature, filtrating the third reaction product in vacuum, washing the third reaction product with deionized water, recrystallizing the third reaction product with ethanol, and drying the third reaction product to obtain a distyryl benzoic acid intermediate;
    (5) dissolving the distyryl benzoic acid intermediate in a fourth reaction kettle filled with a dichloromethane solvent, adding m-chloroperoxybenzoic acid into the fourth reaction kettle at 0-5° C. and stirring and mixing in the fourth reaction kettle for 2-5 h, heating to room temperature and reacting the distyryl benzoic acid with the m-chloroperoxybenzoic acid for 15-30 h to form a fourth reaction product, washing the fourth reaction product with a saturated sodium bicarbonate solution and a saturated saline solution in sequence, and drying the fourth reaction product to obtain a diphenyl epoxy benzoic acid intermediate; and (6) dissolving the diphenyl epoxy benzoic acid intermediate in a fifth reaction kettle filled with an absolute ethanol solvent, adding N,N-dimethylethylamine into the fifth reaction kettle and stirring for reaction of the diphenyl epoxy benzoic acid intermediate with the N,N-dimethylethylamine for 20-40 h to form a fifth reaction product, distilling the fifth reaction product under a reduced pressure, washing the fifth reaction product with acetone, and drying the fifth reaction product to obtain the double quaternary ammonium salt-type benzoic acid.

5. The preparation method for an air-permeable and antibacterial silicone rubber material according to claim 4, wherein a molar ratio of the 3,5-dichlorobenzaldehyde to the 4-vinylphenol in the step (3) is 1:2-2.5.

6. The preparation method for an air-permeable and antibacterial silicone rubber material according to claim 4, wherein a molar ratio of the distyryl benzaldehyde intermediate to the potassium bromide oxidant in the step (4) is 1:0.3-0.5.

7. The preparation method for an air-permeable and antibacterial silicone rubber material according to claim 4, wherein a molar ratio of the distyryl benzoic acid intermediate to the m-chloroperoxybenzoic acid in the step (5) is 1:2-4.

8. The preparation method for an air-permeable and antibacterial silicone rubber material according to claim 4, wherein a molar ratio of the diphenyl epoxy benzoic acid intermediate to the N,N-dimethylethylamine in the step (6) is 1:2-2.5.

9. A method of applying the air-permeable and antibacterial silicone rubber material prepared by the preparation method according to claim 1 in home textiles comprising placing the prepared air-permeable and antibacterial silicone rubber material in a cover body of a home textile material to obtain a home textile material containing a silicone rubber core.

\* \* \* \* \*